No. 622,210. Patented Apr. 4, 1899.
W. DODD & A. D. STRUTHERS.
APPARATUS FOR ILLUSTRATING THE PHENOMENA OF THUNDER AND LIGHTNING.
(Application filed June 13, 1898.)
(No Model.) 2 Sheets—Sheet I.
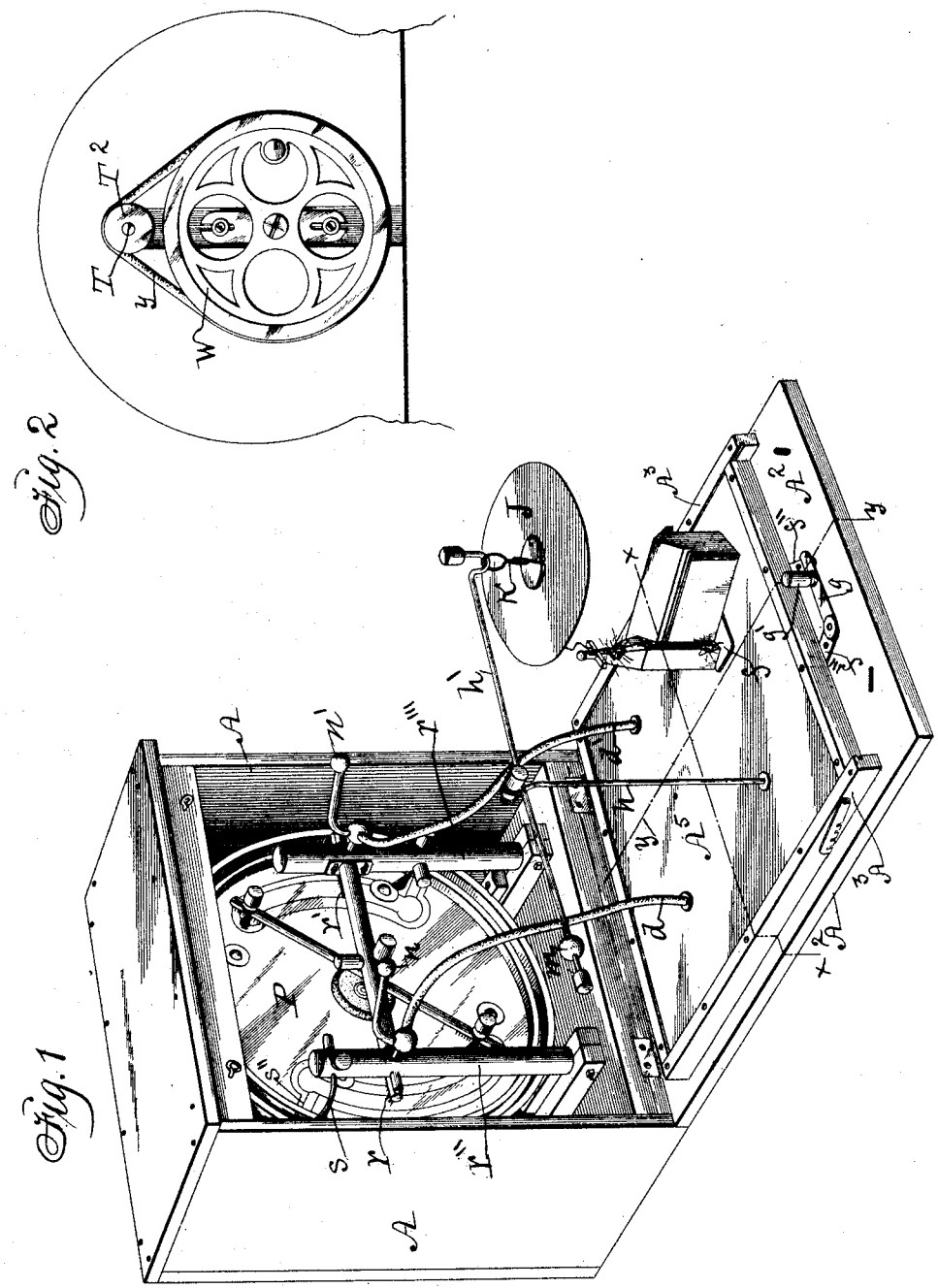
Witnesses:
Jas. Barels.
R. G. Orwig.
Inventors:
West Dodd
Alvin D. Struthers

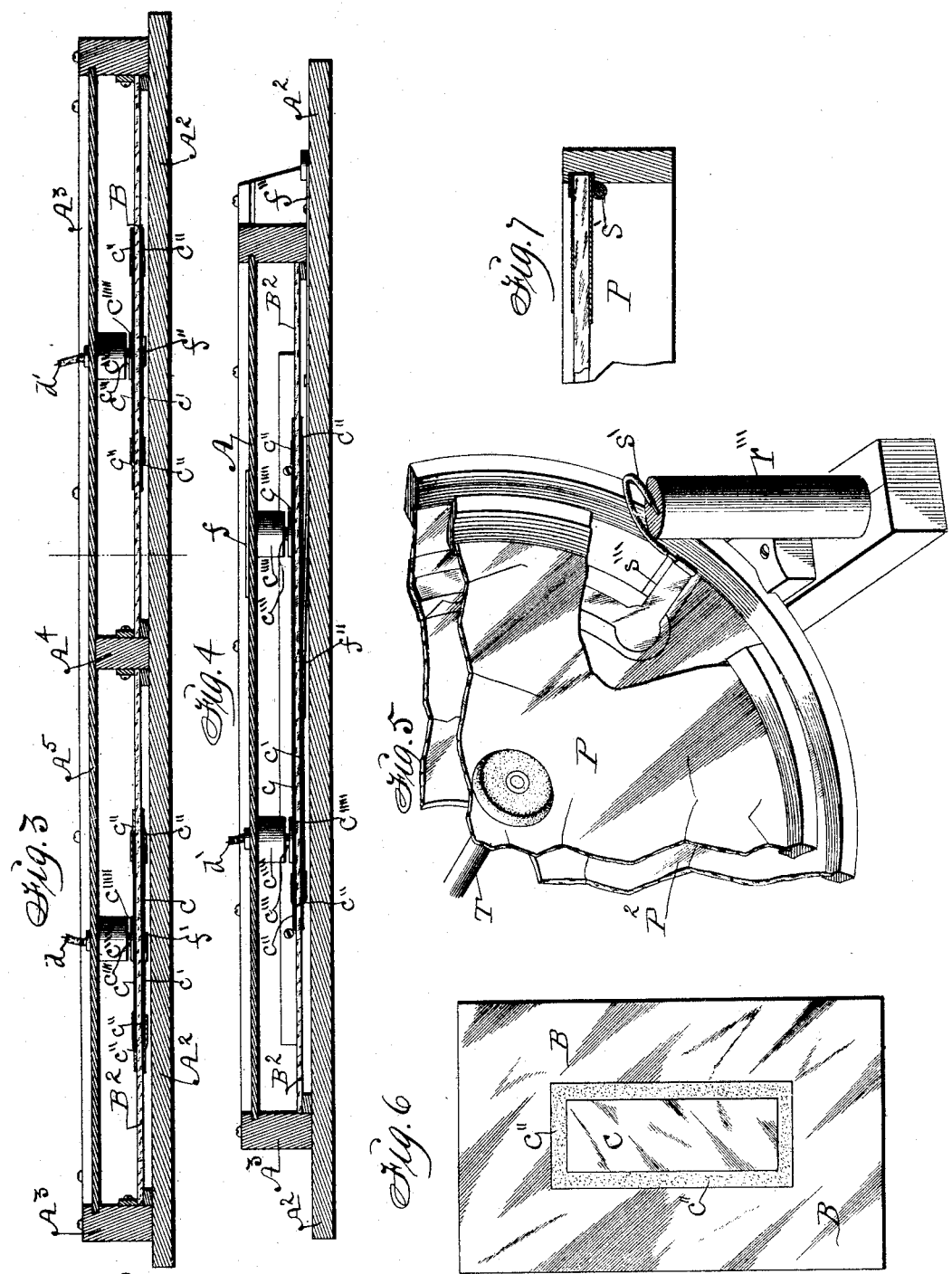

UNITED STATES PATENT OFFICE.

WEST DODD AND ALVIN D. STRUTHERS, OF DES MOINES, IOWA.

APPARATUS FOR ILLUSTRATING THE PHENOMENA OF THUNDER AND LIGHTNING.

SPECIFICATION forming part of Letters Patent No. 622,210, dated April 4, 1899.

Application filed June 13, 1898. Serial No. 683,286. (No model.)

*To all whom it may concern:*

Be it known that we, WEST DODD and ALVIN D. STRUTHERS, citizens of the United States, residing at Des Moines, in the county of Polk and State of Iowa, have invented a new and useful Apparatus for Illustrating the Phenomena of Thunder and Lightning, of which the following is a specification.

Our main object is to provide an apparatus for practically and scientifically demonstrating the philosophy and utility of lightning-rods on buildings to protect them from the destructive force of electricity and the dangers and damages incident to life and property from the effects of lightning during thunder-storms.

A further object is to afford means of instruction and amusement by providing a portable apparatus adapted for giving exhibitions of electric force to illustrate the phenomena of thunder and lightning and its effects upon persons and things electrically connected with the apparatus, so that electricity will be visible to the sense of sight, audible to the sense of hearing, felt by the sense of feeling, and perceptible to the sense of smell.

Our invention consists in the construction, arrangement, and combination of elements and subcombinations with a portable case and a generator of electricity, as hereinafter set forth, pointed out in our claims, and illustrated in the accompanying drawings, in which—

Figure 1 is a perspective view of our portable apparatus, showing the hinged door of the case open and in a horizontal position to serve as a platform upon which miniature buildings can be placed under an artificial cloud in the form of a metal disk suspended above the miniature building or other movable objects that may be placed on the platform. Fig. 2 is a face view of the belt-wheels connected with the case to impart rotary motion to the shaft that extends through one of the glass disks in the frictional generator and is fixed to the parallel glass disk to rotate said disk. Fig. 3 is an enlarged sectional view on the line $xx$ of Fig. 1, showing operative mechanism for storing positive and negative electricity combined with the hinged door of the case. Fig. 4 is a corresponding view on the line $yy$ of Fig. 1, further illustrating the operative devices combined with the hinged door. Fig. 5 is an enlarged view of parts of the frictional generator and a post and conductor combined therewith. Fig. 6 is a diagrammatical view of one of the plates connected with the hinged door of the case and adapted for storing electricity therein. Fig. 7 is a detail view showing a conductor connected with the fixed plate of the generator.

The letter A designates a wooden case, and $A^2$ a hinged door adapted to be extended in a horizontal plane at the bottom of the case, as shown in Fig. 1, to serve as a platform to support a miniature building and to inclose means for storing electricity and operative devices essential to the practical operation of the apparatus.

$A^3$ is a quadrangular frame fixed on the inside of the hinged door, so it will be on top when the door is open and concealed when the door is closed.

$A^4$ is a partition or cross-bar fixed in the frame, and $A^5$ is a vulcanized-rubber plate and non-conductor fixed to the top portion of the frame. Two distinct air-tight compartments are thus constructed and combined with the hinged door $A^2$.

B and $B^2$ are accumulators and the equivalents of Leyden jars adapted in form and construction to be fixed in the compartments of the hinged door, as shown in Fig. 3, and in such a manner that they can be charged positively and negatively as Leyden jars. These condensers and accumulators consist of glass plates that have pieces of tin-foil $c$ on their top faces and corresponding pieces $c'$ on their bottom faces and centrally located on the glass plates and surrounded by resistance-rims $c''$, consisting of paper or other suitable material, fixed over the edges of the pieces of tin-foil $c$, as shown in Fig. 6. The surfaces of both top and bottom of each glass B and $B^2$ are coated with shellac to aid in insulation.

$c'''$ are metal conductors fixed in the rubber plate $A^5$ and extended through rubber blocks $c''''$ and provided with annular flanges $c'''''$, that contact with the pieces of tin-foil $c$, as required, to transmit electric currents from the generator through conductors $d$ and $d'$, that are connected therewith, as shown in Fig. 1.

$f$ is a metal plate on top of the rubber plate

A⁵ (shown in Figs. 1 and 4) and electrically connected with the accumulator B² by means of an insulated conductor c''', as shown in Fig. 4.

The frictional generator is one of the kind known as the "Holts" machine, fixed in the case A, where it is concealed and protected when the hinged door A² is closed.

f'' is a flat metal conductor fixed to the wooden door A² and extended under the accumulator B to contact at its inner end portion with the metal foil or plate c', as shown in Fig. 4. f' is a corresponding conductor fixed to said door and extended to contact with the metal plate c' of the accumulator B², as shown in Fig. 3.

g is a circuit-breaker pivotally connected with the outer end of the conductor f''' and provided with an insulated or non-conductor handle g', so that it can be readily moved as required for connecting and disconnecting the outer ends of the conductors f'' and f''' and thereby the condensers and accumulators B and B².

h is a metal rod or post detachably connected with and extended through the rubber plate and platform A⁵ and electrically connected with the plate c on top of the accumulator B.

h' is a metal rod or lever fulcrumed to the top of the post h and electrically connected therewith to support an artificial cloud in the form of a metal disk J, that is detachably connected with the end of the lever by means of a wire loop k, and thereby swingingly suspended over the platform or rubber plate A⁵ and the accumulator B², concealed under said plate, in such a manner that when a potential current is conveyed from the accumulator B through said post and lever to said artificial cloud or disk J it will be stored therein, so that it can by induction pass therefrom to some object electrically connected with the negative accumulator B². m is a counterpoise adjustably connected with the other end of the lever h' to balance the disk J.

n and n' are pivoted electrodes or dischargers frictionally connected with the rotatable glass plate P of the generator by means of combs r and r', that are supported by vulcanized fixed rubber or ebony posts r'' and r''', as shown in Fig. 1, or in any suitable way. The electric combs are also electrically connected with the conductors d and d', as required, to transmit currents from the plate P to the accumulators B and B².

P² is a stationary glass plate in the generator in parallel and concentric position with the rotatable plate P.

s and s' are conductors connected with the inductors s'' and s''' on the stationary plate P² and brushes that contact with the face of the rotatable plate P.

T is the rotatable shaft that carries the glass plate P and has a fixed belt-pulley T², that is operated by means of a wheel w and belt y, connected therewith, as shown in Fig. 2.

In the practical operation of our apparatus when adjusted as shown in Fig. 1 and a miniature building is placed over the accumulator B and upon the plate f, as shown in Fig. 1, and the wheel T is rotated and electricity generated, a positive current will flow through the conductor d to the accumulator B and a negative current to the accumulator B² through the conductor d', and the bottom surfaces of the two accumulators will be connected, by means of the conductors f'' and f''' and the circuit-breaker g, in such a manner that the positive current will pass from the accumulator B, through the post h and lever h', to the disk (artificial cloud) J to be stored therein, and when a miniature building is placed on the metal plate F on top of the rubber platform A⁵ and not protected by a lightning-rod the electricity in the cloud or plate J will by induction leap down upon the building and damage it. The building, resembling a church with a steeple, has disconnected parts of a lightning-rod, and the intermediate spaces allow the currents to tear the wood, as indicated at the two places pointed out by arrows in Fig. 1. At the same instant that zigzag currents are seen to pass from the disk J and flash at the points indicated by damaged spots in the wood of the building at points where the lightning-rod is broken sharp reports will be heard and particles of wood torn from the building to illustrate the phenomena of thunder and lightning and its destructive force upon buildings not properly protected by means of lightning-rods, and when a miniature building that has a complete lightning-rod is substituted for the unprotected one the electricity in the cloud or disk J will be drawn off invisibly, noiselessly, and harmlessly, so that the protected building will not be subjected to the damaging effects of the electricity, that might destroy life and property.

Having thus described the construction, operation, and utility of our invention, what we claim, and desire to secure by Letters Patent therefor, is—

1. In an apparatus for illustrating the phenomena of thunder and lightning, a case having one side hinged at its bottom to extend horizontally to serve as a door, a frame fixed to the inside face of said door, a cross-piece at the center of the frame to produce two compartments, a cover fixed on top of the frame and cross-piece to serve as a platform, an electric accumulator fixed in each compartment, means for storing electricity in said accumulators, and means for discharging electricity to objects placed on the said cover and platform, arranged and combined for the purposes stated.

2. An electric accumulator consisting of a glass plate having a sheet of zinc fixed in a central position on each of its flat faces and a rim of non-conducting material around the edge of each sheet of zinc, as and for the purposes stated.

3. An electric accumulator consisting of a glass plate having a sheet of zinc fixed in a central position on each of its flat faces and a rim of non-conducting material around the edge of each sheet of zinc and the remainder of each side of the glass covered with shellac as and for the purposes stated.

4. An electric accumulator consisting of a glass plate having a sheet of zinc fixed on its top and central portion, a sheet of zinc fixed on its bottom and central portion, a rim of non-conducting material fixed to the glass around the edge of each of said pieces of zinc, and electric conductors connected with each of said pieces of zinc as and for the purposes stated.

5. An electric accumulator consisting of a glass plate having a sheet of zinc fixed on its top and central portion, a sheet of zinc fixed on its bottom and central portion, a rim of non-conducting material fixed to the glass around the edge of each of said pieces of zinc, and electric conductors connected with each of said pieces of zinc, a post electrically connected with said accumulator and a metal disk suspended on the post, as and for the purposes stated.

6. A case having one side hinged to its bottom, a frame fixed to the inside face of the door, a cover fixed on the top of the frame, a partition in the frame to produce two compartments under the cover, an electric accumulator in each compartment, a conductor on the under side of each accumulator and extended to the outside, a circuit-breaker connected with the ends of said conductors, and means for storing electricity in the accumulators, arranged and combined to operate in the manner set forth for the purposes stated.

7. A case having one side hinged to its bottom, a frame fixed to the inside face of the door, a cover fixed on the top of the frame, a partition in the frame to produce two compartments under the cover, an electric accumulator in each compartment, a conductor on the under side of each accumulator and extended to the outside, a circuit-breaker connected with the ends of said conductors, and means for storing electricity in the accumulators, a post connected with the said cover and electrically connected with one of said accumulators, a lever pivoted to the top of said post and a metal disk suspended on one end of said lever arranged and combined to operate in the manner set forth for the purposes stated.

8. A case having one side hinged to its bottom, a frame fixed to the inside face of the door, a cover fixed on the top of the frame, a partition in the frame to produce two compartments under the cover, an electric accumulator in each compartment, a conductor on the under side of each accumulator and extended to the outside, a circuit-breaker connected with the ends of said conductors, and means for storing electricity in the accumulators, a post connected with the said cover and electrically connected with one of said accumulators, a lever pivoted to the top of said post and a metal disk suspended on one end of said lever, a metal plate fixed on top of said cover and platform and electrically connected with one of said accumulators and under said suspended metal disk, arranged and combined to operate in the manner set forth for the purposes stated.

9. A case having one side hinged to its bottom, a frame fixed to the inside face of the door, a cover fixed on the top of the frame, a partition in the frame to produce two compartments under the cover, an electric accumulator in each compartment, a conductor fixed to the under side of each accumulator and extended to the outside, a circuit-breaker connected with the ends of said conductors, and means for storing electricity in the accumulators, a post connected with the said cover and electrically connected with one of said accumulators, a lever pivoted to the top of said post and a metal disk suspended on one end of said lever, a metal plate fixed on top of said cover and platform and electrically connected with one of said accumulators and under said suspended metal disk, a miniature building or movable object placed on the said metal plate on the said cover and platform, arranged and combined to operate in the manner set forth for the purposes stated.

10. An apparatus for illustrating the philosophy of lightning-rods on buildings comprising a case having one side hinged to its bottom, a frame fixed to the inside face of the door, a cover fixed on the top of the frame, a partition in the frame to produce two compartments under the cover, an electric accumulator in each compartment, a conductor fixed to the under side of each accumulator and extended to the outside, a circuit-breaker connected with the ends of said conductors, and means for storing electricity in the accumulators, a post connected with the said cover and electrically connected with one of said accumulators, a lever pivoted to the top of said post and a metal disk suspended on one end of said lever, a metal plate fixed on top of said cover and platform and electrically connected with one of said accumulators and under said suspended metal disk, a miniature building or movable object placed on the said metal plate on the said cover and platform and a machine for generating electricity fixed in the case and electrically connected with the accumulators in the hinged door, all arranged and combined to operate in the manner set forth for the purposes stated.

WEST DODD.
ALVIN D. STRUTHERS.

Witnesses:
R. G. ORWIG,
THOMAS G. ORWIG.